US012578767B2

(12) United States Patent
Zhu et al.

(10) Patent No.: US 12,578,767 B2
(45) Date of Patent: Mar. 17, 2026

(54) SCREEN ASSEMBLY AND ELECTRONIC DEVICE

(71) Applicant: VIVO MOBILE COMMUNICATION CO., LTD., Guangdong (CN)

(72) Inventors: Chuanyi Zhu, Guangdong (CN); Lei Liang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 188 days.

(21) Appl. No.: 17/992,573

(22) Filed: Nov. 22, 2022

(65) Prior Publication Data

US 2023/0080609 A1     Mar. 16, 2023

Related U.S. Application Data

(63) Continuation of application No. PCT/CN2021/094404, filed on May 18, 2021.

(30) Foreign Application Priority Data

May 25, 2020     (CN) .......................... 202010448010.7

(51) Int. Cl.
*G06F 1/16*          (2006.01)

(52) U.S. Cl.
CPC .......... *G06F 1/1681* (2013.01); *G06F 1/1616* (2013.01); *G06F 1/1647* (2013.01)

(58) Field of Classification Search
CPC ........ H05K 7/00; G06F 1/1616; G06F 1/1681
See application file for complete search history.

(56) References Cited

U.S. PATENT DOCUMENTS

| 10,860,274 B2 * | 12/2020 | Son | .................. G06F 1/1681 |
| 11,229,133 B2 * | 1/2022 | Kim | ................. H01F 7/0263 |

(Continued)

FOREIGN PATENT DOCUMENTS

| CN | 101242437 A | 8/2008 |
| CN | 102742168 A | 10/2012 |

(Continued)

OTHER PUBLICATIONS

Extended European Search Report for Application No. 21816545.7, dated Oct. 27, 2023, 8 Pages.

(Continued)

*Primary Examiner* — Anthony Q Edwards
*Assistant Examiner* — Rashen E Morrison
(74) *Attorney, Agent, or Firm* — BROOKS KUSHMAN P.C.

(57) ABSTRACT

A screen assembly and an electronic device. The screen assembly includes: a first screen and a second screen; a first slide rail and a second slide rail; a first magnetic assembly and a second magnetic assembly, where polarities of the first magnetic assembly and the second magnetic assembly are opposite, where the first magnetic assembly abuts against the first slide rail, and the second magnetic assembly abuts against the second slide rail; and a first driving apparatus and a second driving apparatus, where the first driving apparatus drives the first magnetic assembly to rotate along the first slide rail, the second driving apparatus drives the second magnetic assembly to rotate along the second slide rail, and a folding angle between the first screen and the second screen changes from a first angle to a second angle.

13 Claims, 1 Drawing Sheet

(56)  References Cited

U.S. PATENT DOCUMENTS

| | | | |
|---|---|---|---|
| 2009/0100732 A1 | 4/2009 | Seidler | |
| 2011/0187662 A1 | 8/2011 | Lee et al. | |
| 2015/0009614 A1 | 1/2015 | Tsai | |
| 2017/0017273 A1 | 1/2017 | Weldon et al. | |
| 2018/0313399 A1 | 11/2018 | Nakamura | |
| 2018/0356864 A1* | 12/2018 | Lee ..................... | G06F 1/1679 |
| 2021/0375164 A1 | 12/2021 | Liu | |

FOREIGN PATENT DOCUMENTS

| | | | |
|---|---|---|---|
| CN | 205193667 U | 4/2016 |
| CN | 110119260 A | 8/2019 |
| CN | 209375711 U | 9/2019 |
| CN | 209881839 U | 12/2019 |
| CN | 209949166 U | 1/2020 |
| CN | 110827691 A | 2/2020 |
| CN | 111131568 A | 5/2020 |
| CN | 111654564 A | 9/2020 |
| EP | 2775692 A1 | 9/2014 |
| KR | 20160113680 A | 9/2016 |
| KR | 20180135327 A | 12/2018 |

OTHER PUBLICATIONS

First Office Action for Korean Application No. 10-2022-7044471, dated Nov. 13, 2023, 6 Pages.
Extended European Search Report for Application No. 21813545.7, dated Oct. 27, 2023, 8 Pages.
First Office Action for Chinese Application No. 202010448010.7, dated Dec. 2, 2020, 6 Pages.
International Search Report and Written Opinion for Application No. PCT /CN2021/094404, dated Jul. 28, 2021, 8 Pages.

* cited by examiner

SCREEN ASSEMBLY AND ELECTRONIC DEVICE

CROSS-REFERENCE TO RELATED APPLICATIONS

This application is continuation of International Application No. PCT/CN2021/094404 filed on May 18, 2021, which claims priority to Chinese Patent Application No. 202010448010.7, filed on May 25, 2020, which are incorporated herein by reference in their entireties.

TECHNICAL FIELD

This application relates to the field of electronic device technologies, and more specifically, to a screen assembly and an electronic device.

BACKGROUND

With development of display technologies, more foldable screens are used in electronic devices. In an electronic device, display screens are usually combined by using a support structure, and display screens are folded and unfolded by using the support structure, thereby forming a foldable screen in the electronic device.

In the prior art, the support structure is usually a hinge, and a user needs to manually control a display screen to change a folding angle of the display screen.

SUMMARY

An objective of this application is to provide a new technical solution to a screen assembly.

According to a first aspect, a screen assembly is provided. The screen assembly includes:

a first screen and a second screen, where the first screen and the second screen are separately disposed;

a first slide rail and a second slide rail, where the first screen is provided with the first slide rail, and the second screen is provided with the second slide rail;

a first magnetic assembly and a second magnetic assembly, where polarities of the first magnetic assembly and the second magnetic assembly are opposite, where the first magnetic assembly abuts against the first slide rail, and the second magnetic assembly abuts against the second slide rail; and a first driving apparatus and a second driving apparatus, where the first driving apparatus drives the first magnetic assembly to rotate along the first slide rail, the second driving apparatus drives the second magnetic assembly to rotate along the second slide rail, and a folding angle between the first screen and the second screen changes from a first angle to a second angle.

According to a second aspect, an electronic device is provided. The electronic device includes the foregoing screen assembly; and the electronic device further includes a first housing and a second housing, where the first screen is disposed on the first housing, and the second screen is disposed on the second housing.

Figure 1:
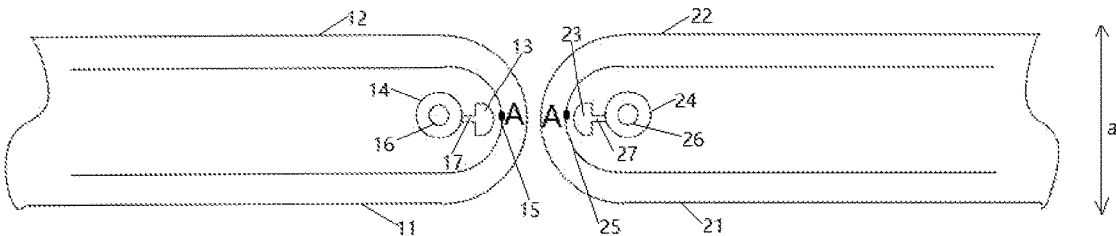
FIG. 1 is a first schematic structural diagram of an electronic device according to this application.

Reference numerals in the accompanying drawings described as follows:

11. first housing; 12. first screen; 13. first magnetic assembly; 14. first driving apparatus; 15. first slide rail; 16. first rotating shaft; 17. first connecting rod;

21. second housing; 22. second screen; 23. second magnetic assembly; 24. second driving apparatus; 25. second slide rail; 26. second rotating shaft; and 27. second connecting rod.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the numbers used in this way are interchangeable in appropriate circumstances, so that the embodiments of this application can be implemented in other orders than the order illustrated or described herein. In addition, the term "and/or" in the specification and claims indicates at least one of connected objects, and the character "/" generally represents an "or" relationship between associated objects.

The electronic device provided in the embodiments of this application is hereinafter described in detail by using specific embodiments with reference to the accompanying drawings.

Figure 2:
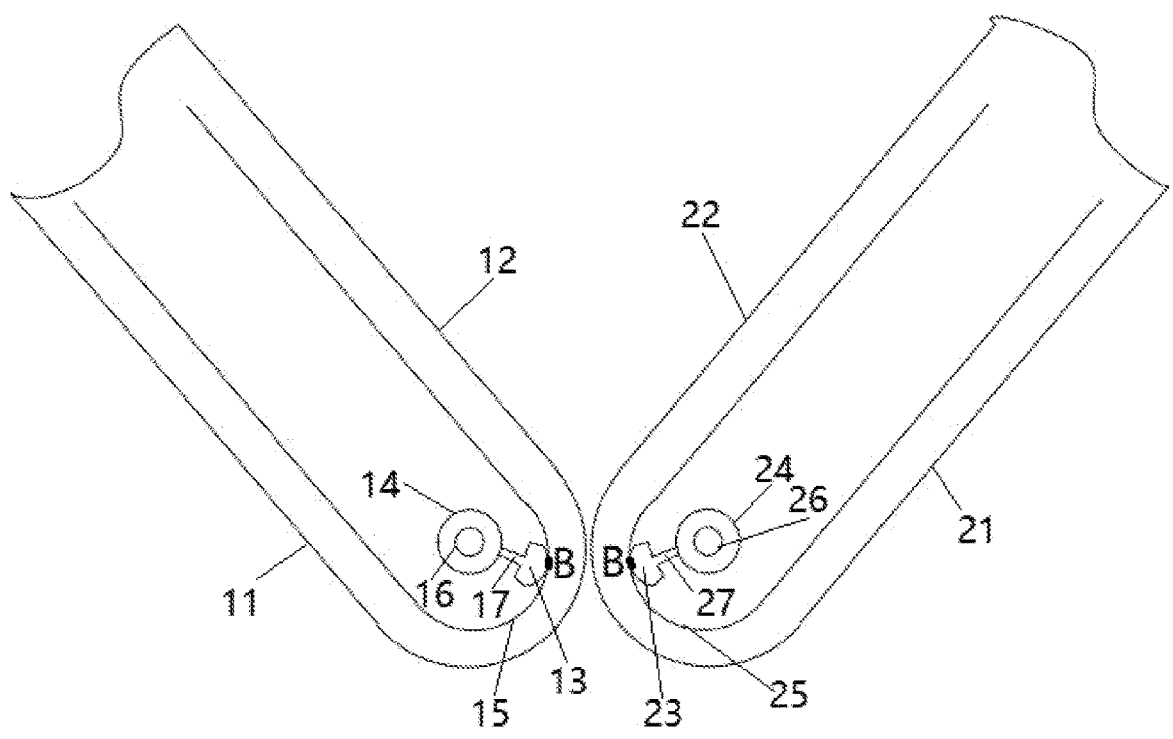
FIG. 2 is a second schematic structural diagram of an electronic device according to this application.

An embodiment of this application provides a screen assembly. Referring to FIG. 1 and FIG. 2, the screen assembly includes a first screen 12, a second screen 22, a first slide rail 15, a second slide rail 25, a first magnetic assembly 13, a second magnetic assembly 23, a first driving apparatus 14, and a second driving apparatus 24.

The first screen 12 and the second screen 22 are disposed separately. For example, the first screen 12 and the second screen 22 are disposed separately, where the first screen 12 and the second screen 22 can separately display a complete picture, or the first screen 12 and the second screen 22 are spliced together to display a complete picture.

The first screen 12 is provided with the first slide rail 15, and the second screen 22 is provided with the second slide rail 25. For example, the first slide rail 15 is fixedly disposed on the first screen, and the second slide rail 25 is fixed on the second screen 22.

Polarities of the first magnetic assembly 13 and the second magnetic assembly 23 are opposite.

For example, the first magnetic assembly 13 and the second magnetic assembly 23 are disposed opposite to each other, and opposite surfaces of the first magnetic assembly 13 and the second magnetic assembly 23 have opposite polarities, so that the first magnetic assembly 13 and the second magnetic assembly 23 have mutually attractive force. Because the first magnetic assembly 13 and the second magnetic assembly 23 have mutually attractive force, although the first screen 12 and the second screen 22 have separate structures, the first screen 12 and the second screen 22 can always be in contact with each other.

The first magnetic assembly 13 abuts against the first slide rail 15; and the second magnetic assembly 23 abuts against the second slide rail 25. For example, the first magnetic assembly 13 is disposed on the first slide rail 15, the first magnetic assembly 13 is driven by the first driving apparatus 14, the first magnetic assembly 13 rotates from a first position A to a second position B, and the first magnetic assembly 13 abuts against the first slide rail 15; and the second magnetic assembly 23 is disposed on the second slide rail 15, the second magnetic assembly 23 is driven by the second driving apparatus 24, the second magnetic assembly rotates from a first position A to a second position B, and the second magnetic assembly 13 abuts against the second slide rail 15.

The first driving apparatus 14 is connected to the first magnetic assembly 13, and the first driving apparatus 14 drives the first magnetic assembly 13 to rotate along the first slide rail 15. The second driving apparatus 24 is connected to the second magnetic assembly 23, and the second driving apparatus 24 drives the second magnetic assembly 23 to rotate along the second slide rail 25. A folding angle between the first screen 12 and the second screen 22 changes from a first angle to a second angle.

Referring to FIG. 1 and FIG. 2, in this example, the first driving apparatus 14 drives the first magnetic assembly 13 to rotate from the first position A to the second position B along the first slide rail 15, and the second driving apparatus 24 also drives the second magnetic assembly 23 to rotate from the first position A to the second position B along the second slide rail 25. For example, referring to FIG. 1, when the first magnetic assembly 13 and the second magnetic assembly 23 are both located at the first position A, the first screen 12 and the second screen 22 are located on a same plane, the first screen 12 and the second screen 22 constitute a larger display screen, and an angle between the first screen 12 and the second screen 22 is 180°.

Referring to FIG. 2, when the first magnetic assembly 13 and the second magnetic assembly 23 are both located at the second position B, the angle between the first screen 12 and the second screen 22 is an acute angle.

On the first screen 12, a distance between the first position A and a first surface of the first screen 12 is a first distance; and a distance between the second position B and the first surface of the first screen 12 is a second distance, where the first distance is longer than the second distance.

The first surface of the first screen 12 is defined as follows: The first screen 12 has a display surface and a non-display surface opposite to the display surface and facing an opposite direction. The non-display surface in this example is the first surface of the first screen 12.

In this embodiment of this application, the first screen is provided with the first driving apparatus and the first magnetic assembly; the second screen is provided with the second driving apparatus and the second magnetic assembly, where the first driving apparatus and the second driving apparatus can respectively drive the first magnetic assembly and the second magnetic assembly to rotate and further drive the first screen and the second screen to rotate, to adjust the folding angle between the first screen and the second screen.

Optionally, the screen assembly in this example is applied to an electronic device, and the first driving apparatus and the second driving apparatus may be driving apparatuses originally disposed on the electronic device and configured to drive other functional modules of the electronic device. For example, the electronic device is a mobile phone, and a vibration motor is originally disposed inside the mobile phone to drive the mobile phone to vibrate. In this example, the driving apparatuses originally disposed on the electronic device may be used as the first driving apparatus and the second driving apparatus, thereby saving internal space of the electronic device.

Optionally, referring to FIG. 1 and FIG. 2, the first slide rail 15 has a first end and a second end, and the first end of the first slide rail 15 is connected to the first screen 12; and
  the second slide rail 25 has a first end and a second end, and the first end of the second slide rail 25 is connected to the second screen 22.

Specifically, the first end of the first slide rail 15 is connected to the first surface of the first screen 12, and the second end of the first slide rail 15 is disposed away from the first surface of the first screen 12.

The first end of the second slide rail 25 is connected to a first surface of the second screen 22, and the second end of the second slide rail 25 is disposed away from the first surface of the second screen 22.

For example, referring to FIG. 1, the first magnetic assembly 13 is driven by the first driving apparatus, and the first magnetic assembly 13 rotates to the first position A of the first slide rail 15; and the second magnetic assembly 23 is driven by the second driving apparatus to rotate to the first position A of the second slide rail 25. In this case, the first screen 12 and the second screen 22 rotate to the same plane, the first screen 12 and the second screen 22 constitute a larger display screen, and the angle between the first screen 12 and the second screen 22 is 180°.

Referring to FIG. 2, the first magnetic assembly 13 is driven by the first driving apparatus 14, the first magnetic assembly 13 rotates counterclockwise, and the first magnetic assembly 13 rotates to the second position B of the first slide rail 15; because the first magnetic assembly 13 and the second magnetic assembly 23 have mutually attractive force, the second magnetic assembly 23 is driven by the second driving apparatus 24, the second magnetic assembly 23 rotates clockwise, and the second magnetic assembly 23 rotates to the second position B of the second slide rail 25; during the rotation of the first magnetic assembly 13 and the second magnetic assembly 23, the first screen 12 and the second screen 22 rotate toward each other; and when the first magnetic assembly 13 abuts against the first slide rail 15 and the first magnetic assembly 13 is fixed at the second position B of the first slide rail, and the second magnetic assembly 23 abuts against the second slide rail 25 and the second magnetic assembly 23 is fixed at the second position B of the second slide rail 25, the angle between the first screen 12 and the second screen 22 is an acute angle.

Approximate trajectories of the first slide rail 15 and the second slide rail 25 are consistent with a direction shown by an arrow a in FIG. 1, where the direction shown by the arrow a is a thickness direction of the screen assembly, that is, the approximate trajectories of the first slide rail 15 and the second slide rail 25 are consistent with the thickness direction of the screen assembly.

Driven by the first driving apparatus 14 and the second driving apparatus 24, the first magnetic assembly 13 and the second magnetic assembly 23 can rotate along the first slide rail 15 and the second slide rail 25 respectively. In this example, the first slide rail 15 and the second slide rail 25 have a guiding function, so that the first driving apparatus and the second driving apparatus can conveniently control the first magnetic assembly and the second magnetic assembly.

Optionally, referring to FIG. 1 and FIG. 2, a first surface of the first slide rail 15 close to the first magnetic assembly 13 is arc-shaped or polygonal; and a first surface of the second slide rail 25 close to the second magnetic assembly 23 is arc-shaped or polygonal.

For example, when the first surface of the first slide rail 15 and the first surface of the second slide rail 25 are arc-shaped, the first magnetic assembly 13 and the second magnetic assembly 23 can respectively rotate along the first slide rail 15 and the second slide rail 25 smoothly.

Alternatively, the first surface of the first slide rail 15 and the first surface of the second slide rail 25 are polygonal, and the first surface of the first slide rail 15 and the first surface of the second slide rail 25 have edges. In this example, assuming that the first driving apparatus 14 drives the first magnetic assembly 13, when the first driving apparatus 14 drives the first magnetic assembly 13 to rotate and further drives the first screen 12 to rotate to a preset angle, the first magnetic assembly 13 abuts against the first slide rail 15. Because the first surface of the first slide rail 15 has an edge, the first magnetic assembly 13 can abut against the edge. In this example, the first magnetic assembly is prevented from falling off from the first slide rail, which otherwise affects the folding angle between the first screen and the second screen.

Optionally, the first magnetic assembly 13 and the second magnetic assembly 23 are both strong magnets.

Specifically, neodymium iron boron may be used as a material of the strong magnet. The neodymium iron boron is characterized by a small size, a light weight, and a strong magnetic property, and when disposed on a slide rail, it does not need to occupy excessive internal space. In addition, the strong magnetic property of the neodymium iron boron can drive the first screen and the second screen to rotate, to adjust the folding angle between the first screen and the second screen.

Optionally, the screen assembly is provided with a first control board and a second control board;

a first coil is wound around the first magnetic assembly 13, and the first coil is electrically connected to the first control board; and a second coil is wound around the second magnetic assembly 23, and the second coil is electrically connected to the second control board.

The first coil is a first conductive coil, and the second coil is a second conductive coil.

Specifically, for example, a first electromagnet is formed by winding the first conductive coil around the first magnetic assembly 13, and the first conductive coil is electrically connected to the first control board. A magnitude of a current input to the first conductive coil is adjusted by the first control board to control a magnetic property of the first electromagnet.

A second electromagnet is formed by winding the second conductive coil around the second magnetic assembly 23, and the second conductive coil is electrically connected to the second control board. A magnitude of a current input to the second conductive coil is adjusted by the second control board to control a magnetic property of the second electromagnet.

The greater the current flowing into the first conductive coil and the second conductive coil, the stronger the magnetic properties of the first electromagnet and the second electromagnet, and the greater the mutually attractive force between the first electromagnet and the second electromagnet. In this example, after the first screen and the second screen rotate to an angle, because the mutually attractive force between the first magnetic assembly and the second magnetic assembly is stronger, attractive force between the first screen and the second screen is stronger under action of the first magnetic assembly and the second magnetic assembly, and it is easier for the first magnetic assembly and the second magnetic assembly to stabilize the first screen and the second screen at a position.

Winding directions of the first conductive coil and the second conductive coil are determined, or a direction of the current flowing in the first conductive coil and the second conductive coil is determined, so that the first electromagnet and the second electromagnet have mutually attractive force.

Optionally, the first driving apparatus 14 includes a first rotating shaft 16 and a first connecting rod 17; the first rotating shaft 16 is rotatably connected to the first driving apparatus 14; and a first end of the first connecting rod 17 is fixedly connected to the first rotating shaft 16, and a second end of the first connecting rod 17 is fixedly connected to the first magnetic assembly 13. The second driving apparatus 24 has a same structure as the first driving apparatus 14.

For example, the first rotating shaft 16 is disposed on the first driving apparatus 14. When the first driving apparatus 14 is in a working state, the first driving apparatus 14 can drive the first rotating shaft 16 to rotate. Under action of first rotating shaft 16 and the first connecting rod 17, the first rotating shaft 16 can drive the first magnetic assembly 13 to rotate. Because the first magnetic assembly 13 and the second magnetic assembly 23 have mutually attractive force, after the first magnetic assembly 13 rotates to an angle, the second driving apparatus 24 also drives the second magnetic assembly 23 to rotate to an angle. The angle between the first screen 12 and the second screen 22 is adjusted by changing a position relationship between the first magnetic assembly 13 and the second magnetic assembly 23 on the first slide rail 15 and the second slide rail 25.

The second driving apparatus 24 includes a second rotating shaft 26 and a second connecting rod 27; the second rotating shaft 26 is rotatably connected to the second driving apparatus 24; and a first end of the second connecting rod 27 is fixedly connected to the second rotating shaft 26, and a second end of the second connecting rod 27 is fixedly connected to the second magnetic assembly 23.

In this example, the structure for driving the first magnetic assembly and the second magnetic assembly to rotate is simple; the polarities of the first magnetic assembly and the second magnetic assembly are different; and the first magnetic assembly and the second magnetic assembly have mutually attractive force. An edge of the first screen and an edge of the second screen can be tightly attached to each other due to the mutually attractive force between the first magnetic assembly and the second magnetic assembly. Therefore, the folding angle between the first screen and the second screen can be adjusted only by adjusting the positions of the first magnetic assembly and the second magnetic assembly on the first slide rail and the second slide rail.

Optionally, the first rotating shaft 16 is a damping rotating shaft.

In this example, the first driving apparatus and the second driving apparatus drive the first magnetic assembly and the second magnetic assembly to rotate and adjust the folding angle between the first screen and the second screen, and can stabilize the first magnetic assembly and the second magnetic assembly respectively on the first slide rail and the second slide rail, thereby stabilizing the folding angle between the first screen and the second screen. Optionally, the second rotating shaft 26 is also a damping rotating shaft.

According to another aspect of this application, an electronic device is provided. Referring to FIG. 1 and FIG. 2, the electronic device includes the foregoing screen assembly; and the electronic device further includes a first housing 11 and a second housing 21, where the first screen 12 is disposed on the first housing 11, and the second screen 22 is disposed on the second housing 21.

In this example, the first housing 11 and the second housing 21 of the electronic device are disposed separately. For example, the first housing 11 and the second housing 21 are disposed separately, the first housing 11 and the second housing 21 may be used separately, and the first housing 11 and the second housing 21 may be combined to constitute the housing of the electronic device.

When the first screen 12 is disposed on the first housing 11, the first driving apparatus 14 is disposed inside the first housing 11; and when the second screen 22 is disposed on the second housing 21, the second driving apparatus 24 is disposed inside the second housing 21.

In this example, the first driving apparatus and the second driving apparatus can respectively drive the first magnetic assembly and the second magnetic assembly to rotate and further drive the first screen and the second screen to rotate, to adjust the folding angle between the first screen and the second screen. The electronic device in this example may be a smartphone, a tablet computer, a wearable electronic device, or the like.

Optionally, the first slide rail 15 has the first end and the second end, and the first end of the first slide rail 15 is connected to the first surface of the first screen 12; and the second end of the first slide rail 15 is connected to a first surface of the first housing 11; and the second slide rail 25 has the first end and the second end, and the first end of the second slide rail 25 is connected to a first surface of the second screen 22; and the second end of the second slide rail 25 is connected to a first surface of the second housing 21.

The first surface of the first screen 12 is defined as follows: The first screen 12 has a display surface and a non-display surface opposite to the display surface and facing an opposite direction. The non-display surface in this example is the first surface of the first screen 12.

The first surface of the first housing 11 is defined as follows: The first surface of the first housing is a surface disposed opposite to the non-display surface of the first screen 12.

The first magnetic assembly 13 abuts against the first slide rail 15, and the second magnetic assembly 23 abuts against the second slide rail 25; and the first driving apparatus 14 drives the first magnetic assembly 13 to rotate along the first slide rail 15, and the second driving apparatus 14 drives the second magnetic assembly 23 to rotate along the second slide rail 25.

Driven by the first driving apparatus 14 and the second driving apparatus 24, the first magnetic assembly 13 and the second magnetic assembly 23 can rotate along the first slide rail 15 and the second slide rail 25 respectively. In this example, the first slide rail 15 and the second slide rail 25 have a guiding function, so that the first driving apparatus and the second driving apparatus can conveniently control the first magnetic assembly and the second magnetic assembly.

Optionally, a side wall of the first housing 11 constitutes the first slide rail, and a side wall of the second housing 21 constitutes the second slide rail.

In this example, the first magnetic assembly 13 is disposed on the side wall of the first housing 11, and the first magnetic assembly 13 rotates along the side wall of the first housing 11 and further drives the first screen 12 to rotate. When the first screen 12 rotates to a preset angle, the first magnetic assembly 13 abuts against the side wall of the first housing 11, so that the first magnetic assembly 13 can be stabilized on the side wall of the first housing 11. The second magnetic assembly 23 is disposed on the side wall of the second housing 21, and the second magnetic assembly 23 rotates along the side wall of the second housing 21 and further drives the second screen 22 to rotate. When the second screen 22 rotates to a preset angle, the second magnetic assembly 23 abuts against the side wall of the second housing 21.

In this example, the side wall of the first housing constitutes the first slide rail, and the side wall of the second housing constitutes the second slide rail. This avoids additionally disposing the first slide rail and the second slide rail on the electronic device and saves internal space of the electronic device.

Optionally, the electronic device further includes an angle sensor, and the angle sensor is disposed on the first screen 12 or the second screen 22. In this example, the angle sensor is disposed on the first screen 12 or the second screen 22, and the angle sensor records the folding angle between the first screen 12 and the second screen 21 in real time; and the angle sensor is electrically connected to the control board disposed on the electronic device, and the folding angle recorded by the angle sensor can be displayed on the first screen or the second screen. Optionally, the angle sensor may be a Hall sensor. The Hall sensor determines the folding angle between the first screen and the second screen by sensing magnetic field strength between the first magnetic assembly and the second magnetic assembly. Calculation of the folding angle by the Hall sensor through magnetic induction has become the prior art, and is not described in this embodiment herein.

Optionally, the angle sensor may alternatively be disposed on the rotating shaft or a mover of the driving apparatus, and the angle sensor determines the folding angle between the first screen and the second screen by using the number of rotations of the rotating shaft or the mover of the driving apparatus, or the like.

Optionally, the first magnetic assembly 13 and the second magnetic assembly 23 are respectively disposed on the electronic device in a mirror-symmetric manner.

The first driving apparatus 14 drives the first magnetic assembly 13 to rotate along the first slide rail 15 from the first position A to the second position B, and the second driving apparatus 24 also drives the second magnetic assembly 23 to rotate along the second slide rail 25 from the first position A to the second position B. The polarities of the first magnetic assembly and the second magnetic assembly are opposite, and the first magnetic assembly and the second magnetic assembly have mutually attractive force. During the rotation of the first magnetic assembly and the second magnetic assembly, the first magnetic assembly and the second magnetic assembly are always distributed as mirror-symmetric about a plane.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

The embodiments of this application are described above with reference to the accompanying drawings. However, this application is not limited to the foregoing specific embodiments. The foregoing specific embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

What is claimed is:

1. A screen assembly, applied to an electronic device, comprising:

a first screen and a second screen, wherein the first screen and the second screen are separately disposed;

a first slide rail and a second slide rail, wherein the first screen is provided with the first slide rail, and the second screen is provided with the second slide rail;

a first magnetic assembly and a second magnetic assembly, wherein polarities of the first magnetic assembly and the second magnetic assembly are opposite, wherein the first magnetic assembly abuts against the first slide rail, and the second magnetic assembly abuts against the second slide rail; and a first driving apparatus and a second driving apparatus, wherein the first driving apparatus drives the first magnetic assembly to rotate along the first slide rail, the second driving apparatus drives the second magnetic assembly to rotate along the second slide rail, and a folding angle between the first screen and the second screen changes from a first angle to a second angle;

wherein the first screen, the first slide rail, the first magnetic assembly, and the first driving apparatus are provided sequentially, and the second screen, the second slide rail, the second magnetic assembly, and the second driving apparatus are provided sequentially;

the first screen is disposed on a first housing of the electronic device, and the second screen is disposed on a second housing of the electronic device; and the first slide rail is a side wall of the first housing, and the second slide rail is a side wall of the second housing;

wherein the first driving apparatus comprises a first rotating shaft and a first connecting rod; a first end of the first connecting rod is fixedly connected to the first rotating shaft, and a second end of the first connecting rod is fixedly connected to the first magnetic assembly; and the second driving apparatus has a same structure as the first driving apparatus.

2. The screen assembly according to claim 1, wherein the first slide rail has a first end and a second end, and the first end of the first slide rail is connected to the first screen; and the second slide rail has a first end and a second end, and the first end of the second slide rail is connected to the second screen.

3. The screen assembly according to claim 1, wherein the first magnetic assembly and the second magnetic assembly are both strong magnets.

4. The screen assembly according to claim 1, wherein the screen assembly is provided with a first control board and a second control board;

a first coil is wound around the first magnetic assembly, and the first coil is electrically connected to the first control board; and a second coil is wound around the second magnetic assembly, and the second coil is electrically connected to the second control board.

5. The screen assembly according to claim 1, wherein a first surface of the first slide rail close to the first magnetic assembly is arc-shaped or polygonal; and a first surface of the second slide rail close to the second magnetic assembly is arc-shaped or polygonal.

6. The screen assembly according to claim 1, wherein the first rotating shaft is a damping rotating shaft.

7. An electronic device, comprising a screen assembly, wherein the screen assembly comprises:

a first screen and a second screen, wherein the first screen and the second screen are separately disposed;

a first slide rail and a second slide rail, wherein the first screen is provided with the first slide rail, and the second screen is provided with the second slide rail;

a first magnetic assembly and a second magnetic assembly, wherein polarities of the first magnetic assembly and the second magnetic assembly are opposite, wherein the first magnetic assembly abuts against the first slide rail, and the second magnetic assembly abuts against the second slide rail; and a first driving apparatus and a second driving apparatus, wherein the first driving apparatus drives the first magnetic assembly to rotate along the first slide rail, the second driving apparatus drives the second magnetic assembly to rotate along the second slide rail, and a folding angle between the first screen and the second screen changes from a first angle to a second angle;

wherein the first screen, the first slide rail, the first magnetic assembly, and the first driving apparatus are provided sequentially, and the second screen, the second slide rail, the second magnetic assembly, and the second driving apparatus are provided sequentially;

the electronic device further comprises a first housing and a second housing, wherein the first screen is disposed on the first housing, and the second screen is disposed on the second housing;

wherein the first slide rail is a side wall of the first housing, and the second slide rail is a side wall of the second housing;

wherein the first driving apparatus comprises a first rotating shaft and a first connecting rod; a first end of the first connecting rod is fixedly connected to the first rotating shaft, and a second end of the first connecting rod is fixedly connected to the first magnetic assembly; and the second driving apparatus has a same structure as the first driving apparatus.

8. The electronic device according to claim 7, wherein the first slide rail has a first end and a second end, and the first end of the first slide rail is connected to the first screen; and the second slide rail has a first end and a second end, and the first end of the second slide rail is connected to the second screen.

9. The electronic device according to claim 7, wherein the first magnetic assembly and the second magnetic assembly are both strong magnets.

10. The electronic device according to claim 7, wherein the screen assembly is provided with a first control board and a second control board;

a first coil is wound around the first magnetic assembly, and the first coil is electrically connected to the first control board; and a second coil is wound around the second magnetic
assembly, and the second coil is electrically connected
to the second control board.

11. The electronic device according to claim 7, wherein a
first surface of the first slide rail close to the first magnetic
assembly is arc-shaped or polygonal; and a first surface of
the second slide rail close to the second magnetic assembly
is arc-shaped or polygonal.

12. The electronic device according to claim 7, wherein
the first rotating shaft is a damping rotating shaft.

13. The electronic device according to claim 7, wherein
the first slide rail has the first end and the second end, and
the first end of the first slide rail is connected to a first
surface of the first screen; and the second end of the first
slide rail is connected to a first surface of the first housing;
and the second slide rail has the first end and the second end,
and the first end of the second slide rail is connected to
a first surface of the second screen; and the second end
of the second slide rail is connected to a first surface of
the second housing.

\* \* \* \* \*